United States Patent
Shu

Patent Number: 6,049,440
Date of Patent: Apr. 11, 2000

[54] SELF WRITTEN READ/WRITE TRACK SERVO PARAMETER FOR SPINDLE RRO COMPENSATION

[75] Inventor: Andrew Shu, Cupertino, Calif.

[73] Assignee: Samsung Electronics Co., Ltd., Suwon, Rep. of Korea

[21] Appl. No.: 08/735,952

[22] Filed: Oct. 23, 1996

[51] Int. Cl.[7] .................................................. G11B 5/596
[52] U.S. Cl. ...................................... 360/77.04; 360/77.08
[58] Field of Search .............................. 360/77.04, 77.08, 360/75, 77.14, 77.02, 53

[56] References Cited

U.S. PATENT DOCUMENTS

| | | | |
|---|---|---|---|
| 5,402,280 | 3/1995 | Supino | 360/77.04 |
| 5,404,253 | 4/1995 | Painter | 360/77.04 |
| 5,455,724 | 10/1995 | Suzuki et al. | 360/77.04 |
| 5,500,776 | 3/1996 | Smith | 360/77.04 |
| 5,539,714 | 7/1996 | Andrews, Jr. et al. | 360/77.04 |
| 5,550,685 | 8/1996 | Drouin | 360/77.04 |
| 5,570,247 | 10/1996 | Brown et al. | 360/75 |
| 5,576,909 | 11/1996 | Dierkes et al. | 360/77.04 |
| 5,606,469 | 2/1997 | Kosugi et al. | 360/77.05 |
| 5,615,191 | 3/1997 | Takeda et al. | 360/77.04 |
| 5,774,297 | 6/1998 | Hampshire et al. | 360/77.04 |
| 5,790,333 | 8/1998 | Kimura et al. | 360/77.04 |
| 5,793,559 | 8/1998 | Sheepherd et al. | 360/78.09 |
| 5,867,343 | 2/1999 | Le et al. | 360/77.04 |

*Primary Examiner*—Nabil Hindi
*Attorney, Agent, or Firm*—Jones Volentine, L.L.P.; Jeffrey P. Aiello

[57] ABSTRACT

A method and apparatus is disclosed for compensating for spindle Repetitive Runout (RRO) by writing a servo parameter information field for both read and write tracks. Servo burst patterns may be written by servo writer during drive assembly and may be used to independently position write and read track servo parameter fields for writing in corrected positions. In track following mode, RRO may be calculated over several revolutions and average RRO calculated and stored. Position error values corresponding to RRO for every servo parameter and, thus, every sector, may also be stored in servo parameter gray code fields for both read and write tracks. Servo parameter information may be read back and decoded in a present sector for head position correction in subsequent sectors. For small offset, one servo parameter may be read to correct both read and write track center deviations. For large offsets between write and read element centers one servo parameter may not be read back during both read and write operations therefore two servo parameter fields may be used.

22 Claims, 13 Drawing Sheets

SELF WRITTEN READ/WRITE TRACK SERVO PARAMETER FOR SPINDLE RRO COMPENSATION

CROSS REFERENCE TO RELATED APPLICATION

The subject matter of the present invention is related to that in co-pending U.S. patent application Ser. No. 08/699,788 entitled "Self Calibrating Drive Using Servo Burst for Servo Calibration and Runout Analysis", filed Aug. 20, 1996 and incorporated herein by reference.

FIELD OF THE INVENTION

The present invention is in the field of self calibrating MR head based disk drives. In particular, the present invention relates to generating embedded read and write track servo parameters for precise positioning of an MR head in response to repetitive runout (RRO).

BACKGROUND OF THE INVENTION

Reading information from magnetic media may be enhanced by using magneto resistive (MR) head technology. MR read head technology may allow the areal density of information recorded on magnetic media to be greatly increased. Typical track density in a small form factor disk drive may be around two thousand or more tracks per inch.

Because of increasing track density requirements resulting in greater Tracks Per Inch (TPI), Track Misregistration (TMR) budget must be accordingly smaller for high density drives. A TMR budget may be expressed as a tolerance for allowing an MR head position or registration to deviate from a track center before interfering with data recovery. Maximum error-free data recovery may be accomplished by maintaining MR read head registration at track center as consistently as possible.

Because TMR budgets may be tight due to high track densities, offset generated by repetitive and non-repetitive runout (RRO and NRRO) may be particularly troublesome. In addition, deviations in write track and read track centers from a common actuator arm center may increase problems with TMR management. RRO in the form of eccentricities in the circularity of a track being read and NRRO in the form of wobble from bearing irregularities may cause head misregistration which may exceed TMR budget. Unless compensated for in a manner avoiding excessive overshoot or overcorrection which may, in itself, cause misregistration, RRO and NRRO may prevent error-free data recovery without using high tolerance, high cost spindle motors.

RRO may be due to systematic distortion in disk construction, minute warpage of disk surfaces, slightly off-center placement of a disk spindle with respect to a platter, or rotational harmonics. NRRO may be due, as mentioned, to random perturbations and nutations caused by bearing irregularities and the like. Other sources of RRO and NRRO may be related to high rotational speeds of a typical drive.

Typical disk drive speeds are fixed at 5400 RPM and 7200 RPM. Rotational harmonics associated with RRO may therefore be correlated to multiples of fundamental frequency. NRRO on the other hand, may be more difficult to compensate for based on their transient nature. High precision spindle motors may be available with tighter RRO tolerances at a high cost.

Correcting head position may be one method to deal with disk irregularities. While many methods may exist to position a head and compensate for errors in head position, two primary methods may be favored by designers: dedicated and embedded servo methods. Dedicated servo technology uses one side of a disk platter containing positioning information. A single dedicated head may be used to access a servo positioning platter side with other heads being slaved to the dedicated head.

Dedicated servo approaches are wasteful of disk surface especially in systems with fewer platters. Embedded servo technology overcomes limitations associated with dedicated servo by including positioning information on a data track. Servo burst patterns may be used to correct positioning as a head attempts to follow a data track.

As a read head deviates from track center, a pattern may be read which indicates the direction and relative magnitude of displacement from track center. Information from reading a servo burst pattern may be fed back to head positioning electronics and head position may be corrected accordingly.

FIG. 3 is a timing diagram illustrating servo burst pattern, and other servo sector information of the prior art. During manufacturing, servo burst pattern 307 including A, B, C, and D bursts may be written upon a disk surface by a servo writer. Servo burst patterns may be written in servo sector information areas which may appear at regular intervals along concentric tracks from outer tracks to inner tracks.

Disk sectors may appear as pie slice shaped areas of a disk surface comprising increasingly smaller portions of tracks closer to a disk spindle. In addition to servo burst pattern 307, AGC field 303, servo synch field 304, servo gray code field 305, and ID field 306 may be written. Following servo burst pattern 307 is data field 308. An error correcting code 309 (ECC) may be written at the end of servo sector information. Servo burst patterns may be used to generate a position error signal for positioning an actuator arm.

FIG. 4 is a timing diagram illustrating the timing relationship between servo sector information, servo gate signal and burst window of the prior art. Track data 400 may include servo sector information fields. Servo sector information may include a servo burst pattern comprising A, B, C, and D bursts. A, B, C, and D bursts may be written following a servo preamble, a servo address mark, a servo gray code on a single track.

A servo gate signal 401 may be used to control when a servo burst pattern is written by a servo writer. A servo burst window timing signal 402 may control the write timing of A, B, C, and D bursts by a servo writer. The servo writer may perform writing of burst patterns in servo sectors during disk manufacturing. In prior art approaches, global error stored in servo burst data of an outer track may be used to characterize errors related to harmonics for an entire disk.

Problems with servo bursts written by a servo writer may occur if new eccentricities develop or change between drive assembly and drive certification. Moreover, errors may be present in the servo burst information for a particular sector which may cause head tracking to be lost within that particular sector.

It would be desirable for a servo controller capable of calculating an average RRO error value for all tracks. It would also be desirable for a servo controller capable of writing a multitude of information regarding head positioning with respect to track location in a servo parameter field including average RRO for subsequent sectors. Separate servo parameter information for read and write heads written in position corrected fields would be especially desirable. It would be further desirable for a servo controller capable of comparing present servo parameter position error information and making accurate corrections in head position for subsequent sectors to maximize read signal amplitude for both read and write tracks.

SUMMARY OF THE INVENTION

In a disk drive system, a self calibrating disk drive controller reads a servo burst pattern written by a servo writer and generates read and write track servo parameter position error information which may be written to a disk surface in read and write track servo parameter gray code fields. A servo burst pattern may be read as A, B, C, and D bursts. A servo burst pattern may be read in servo sector information area immediately following a servo preamble, servo synch, and servo gray code field.

Read and write servo parameter fields may be written immediately following servo burst information. A write servo parameter field for a next sector may be written immediately following servo burst information for a present sector. A servo burst information field may be immediately followed by writing a servo parameter address mark, and a write servo parameter gray code field containing position error information for a next sector written using a corrected position.

A read servo parameter information field may be written immediately following a write servo parameter information field separated by writing a read servo address mark, and a read servo parameter gray code using a corrected position. Position may be corrected independently for read and write heads initially by using an average error signal generated by reading A, B, C, and D burst positions and average error information. During subsequent track access, servo parameter information for a present sector may be used to correct head position for subsequent sectors.

Each servo parameter field, read and write track servo parameter fields, may be separately written in an independently position corrected location within a servo sector. Servo parameter information for a read track may be used to correct head position for a write track if deviations are small. Likewise, servo parameter information for a write track may be used to correct head position for a read track for small RRO values or sectors where read and write track deviation is small. For large RRO or large deviations between read track and write track centers, independent servo parameter information for read and write head may be used.

A servo burst pattern comprises four separately offset bursts offset in a manner useful for determining centering of an MR read head over a track center. A first burst, Burst A, may be offset on center a distance of one half of a track spacing on one side of a track center location n. Burst B may be offset on center a distance of one half of a track spacing on another side of a track center location n. Burst C may be read offset on center from track n by a full track in the same direction as Burst A so as to be centered on track n+1. Burst D may be centered on track n. Although described as being read, bursts A, B, C, and D must at some point be initially written.

Offset pattern A, B, C, and D may be initially written by a servo writer during disk assembly. Writing by a servo writer assures servo burst pattern is written according to a known servo sector location and with accurate servo timing. Subsequent writes of calibration burst patterns may be performed at disk calibration and certification by write head circuitry with uniform timing and at precise servo sector locations. Writing calibration burst patterns in a track following mode ensures an accounting for changes in offset associated with actuator arm position changes.

Since read and write heads may be placed along an actuator arm center adjacent to each other, both read and write heads may be aligned over a single track. MR read head element and inductive write head, in track following mode may operate nearly simultaneously as servo burst pattern data in a servo sector on a disk surface is read by MR head element and then calibration burst pattern immediately written as a servo sector passes write head.

In a track following mode, read and write servo parameter fields may be written immediately following a servo burst field. Positioning information may be derived from an average of position error values read from servo bursts A, B, C, and D. Servo bursts may be read and an error signal generated using information gained from relative amplitudes of servo data bursts A, B, C, and D.

Average error for several revolutions may be calculated and stored in memory and used to predict error for a next sector. Corrections to head position may be made using average error information prior to writing read and write servo parameter fields for a next sector. While servo burst patterns may be written by a servo writer early in a manufacturing process for a disk drive, calibration burst pattern may be written during calibration and certification and when read should match average error for servo burst error. Significant differences in servo burst error and calibration burst error may indicate servo loop circuit problems.

BRIEF DESCRIPTIONS OF THE DRAWINGS

DETAILED DESCRIPTION OF THE INVENTION

The descriptions herein are by way of example only illustrating the preferred embodiment of the present invention. However, the method and apparatus of the present invention may be applied in a similar manner in other embodiments without departing from the spirit of the invention.

Figure 1:
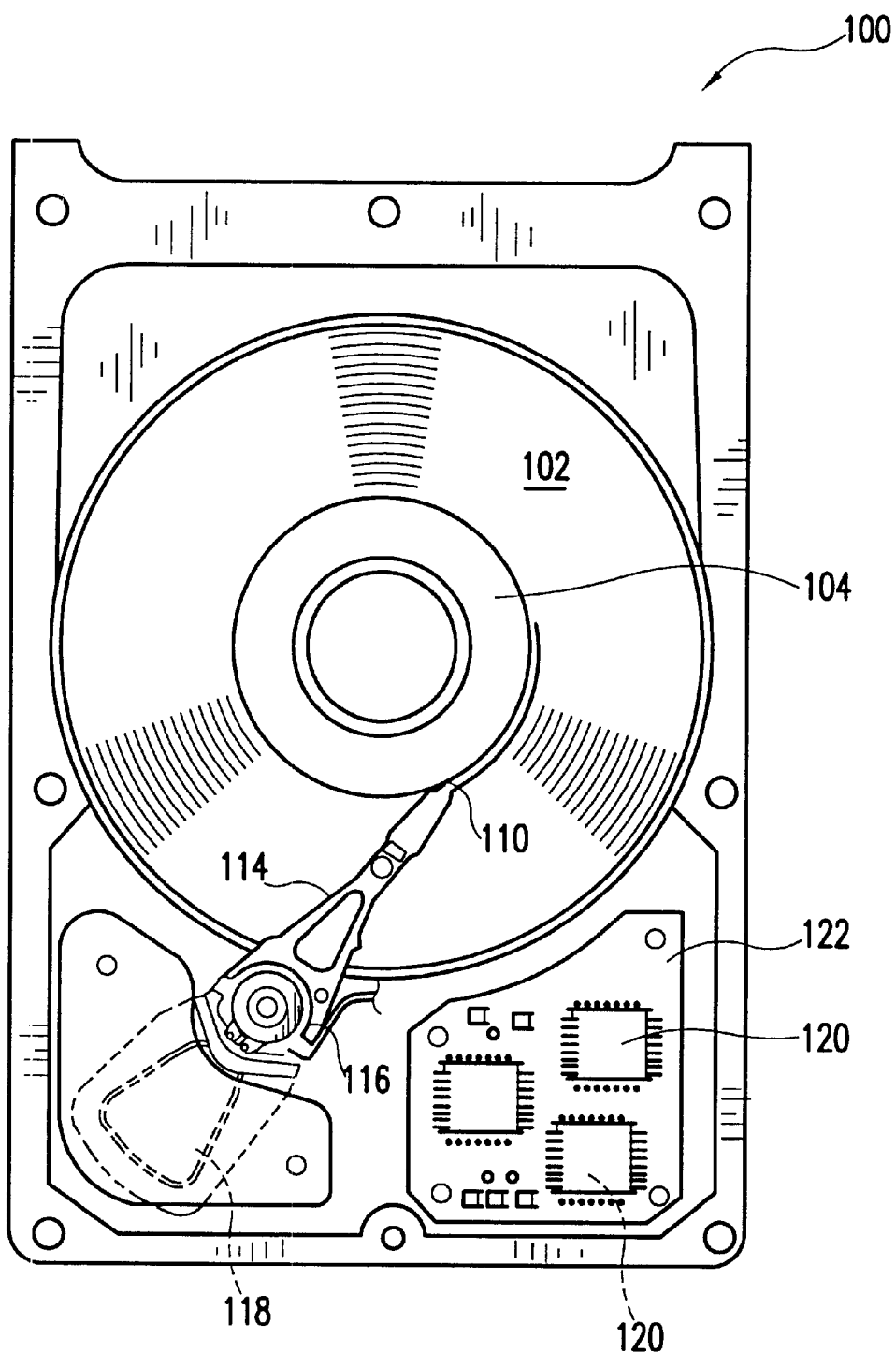
FIG. 1 is a diagram illustrating elements of a disk drive.

FIG. 1 is a diagram illustrating elements of a disk drive. Disk drive 100 includes spindle 104, disk platter surface 102, actuator arm 114, head carrier 110, servo positioning motor 116, counter balance arm 118, servo controller 120, and servo control circuit board 122. The disk platter surface 102 may be coated with a ferro-magnetic material suitable for storing magnetic information.

The disk platter surface 102 may be driven at relatively high speeds, typically 5400 rpm, by a spindle motor drive. The actuator arm 114 may be driven by the servo positioning motor 116. A read head element and a write head element may be fixed to the head carrier 110, which may in turn be fixed to the actuator arm 114 at one end. A read head element may be of the kind known in the art as magneto resistive or MR, while a write head element may be of the kind known in the art as inductive.

Figure 2B:
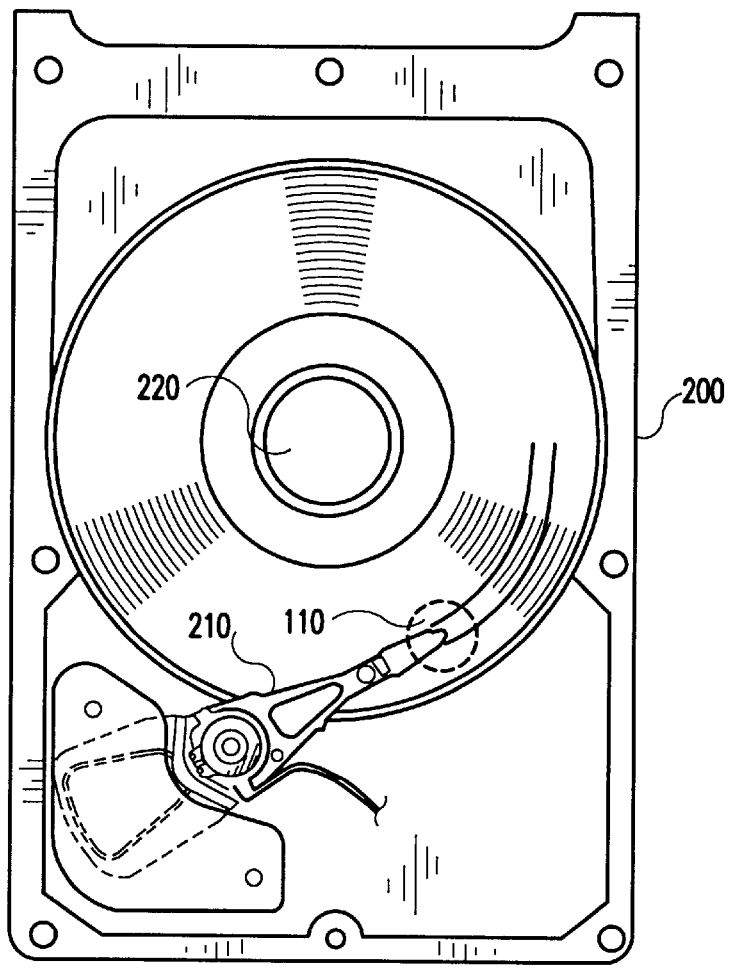
FIG. 2B is a diagram illustrating the mechanical relationship between MR read head and write head elements and actuator arm center.
Figure 2A:
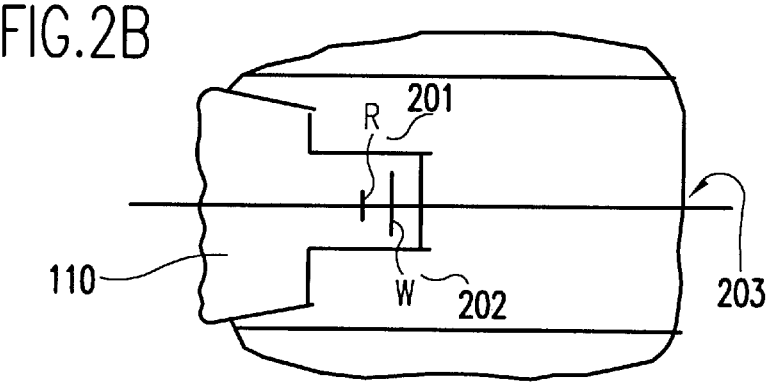
FIG. 2A is a diagram illustrating the mechanical layout of actuator arm, including read and write head, disk platter and disk drive chassis.
Figure 3:
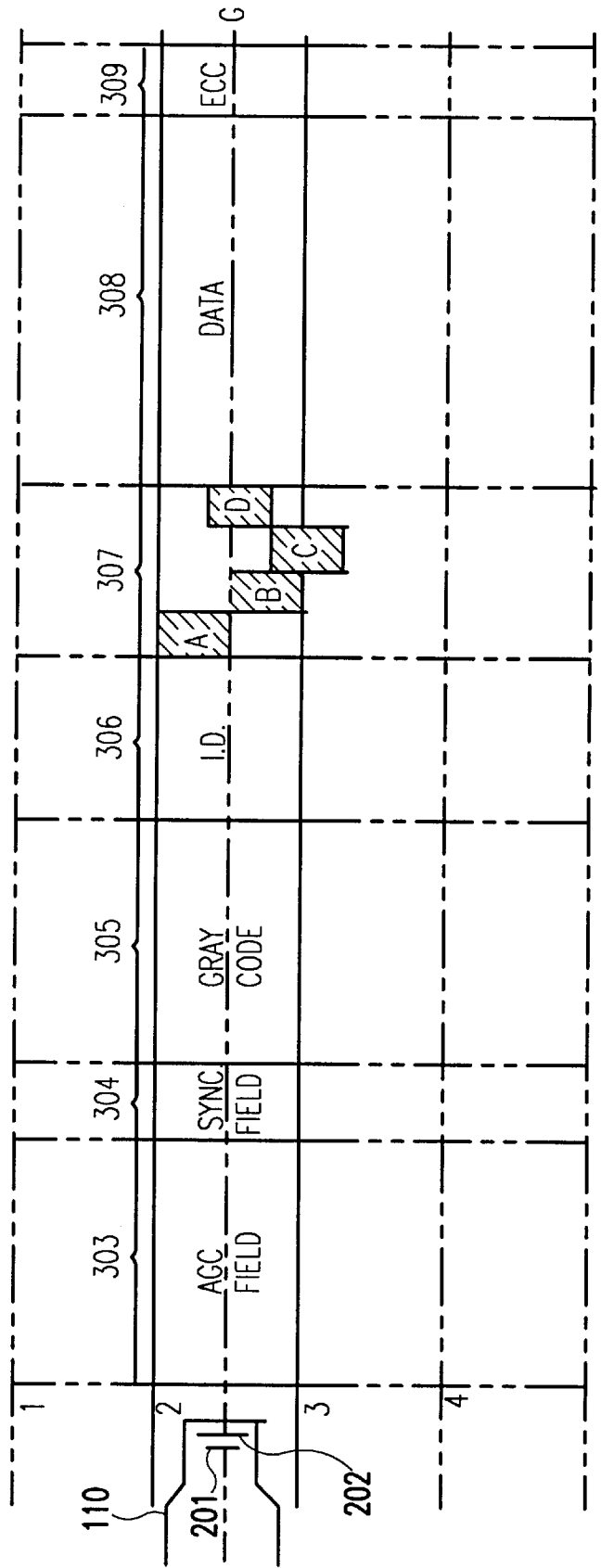
FIG. 3 is a timing diagram illustrating servo burst pattern, and other servo sector information of the prior art.
Figure 4:
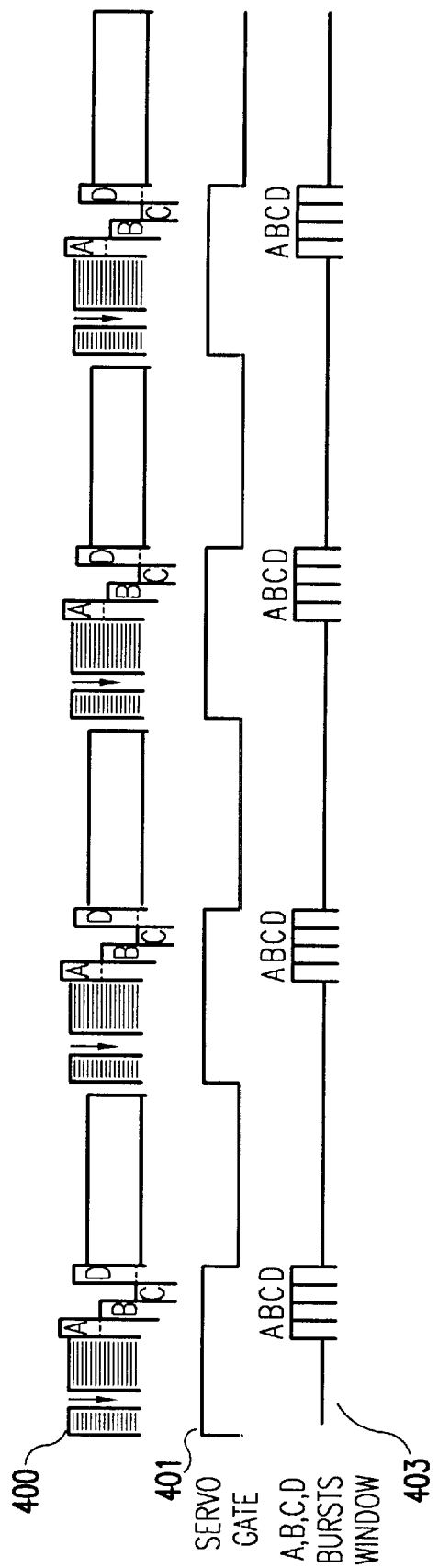
FIG. 4 is a timing diagram illustrating the timing relationship between servo sector information, servo gate signal and burst window of the prior art.

FIG. 2A is a diagram illustrating the mechanical layout of the actuator arm, including read and write head, disk platter and disk drive chassis. Disk drive chassis 200 may support a spindle motor for driving disk platters at high speed, actuator arm 210 for positioning read and write heads located on head carrier 110. In addition, disk drive chassis may be used to support drive electronics including the controller of the present invention.

FIG. 2B is a diagram illustrating the mechanical relationship between MR read head and write head elements and actuator arm center. Read head element 201 center may be positioned as near as possible to head carrier 110 central axis 203. Offsets between head carrier 110 central axis 203 and read head element 201 center may be the primary offset to be compensated for in the preferred embodiment of the present invention.

Write head element 202 may also be placed on center with head carrier 110 central axis 203 in a position adjacent to read head element 201. Since write head element 202 offset may translate directly into actual track position, and since no feedback on actual track position may be available until a read is performed, read head element 201 may be used to determine offset of write head element 202 by reading a servo burst pattern and a calibration burst pattern. Offset may occur at either side of central axis 203 may be equal to zero.

Write head element 202 may also be offset from central axis 203. Offset may occur at either side of central axis 203 or may be equal to zero. Offsets may occur on the same side of central axis 203, or on different sides of central axis 203.

In addition to placement error offset, head electrical centers may not correspond exactly to actual head mechanical centers. Even though head manufacturers may desire to have electrical centers and mechanical centers coincide, it may not be economically feasible to detect and correct minute differences between mechanical and electrical centers.

The present invention may be used to correct for such differences in mechanical offsets and other anomalies which may give rise to deviations from track center when reading data from or writing data to a disk drive surface. Included in such disturbances, repetitive runout RRO may be compensated for by storing information related to RRO in servo parameter fields corresponding to read and write heads. Servo parameter fields may be written immediately following servo burst information using independently corrected head positions. In order to make servo parameter information more readable by controller circuitry, servo parameter information may be gray encoded.

Figure 5:
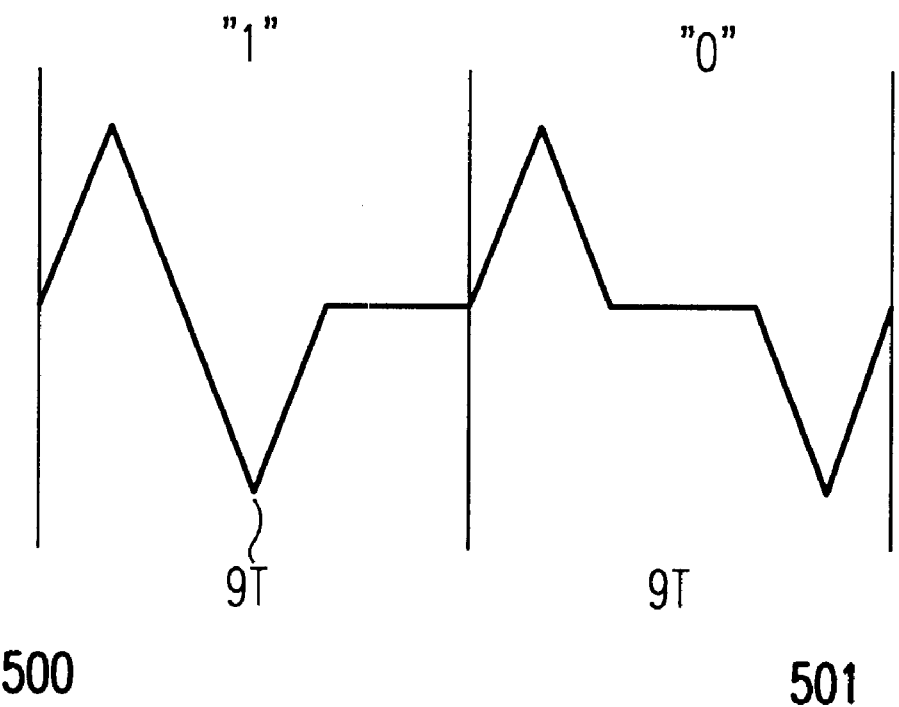
FIG. 5 is a timing diagram illustrating timing of two bits of a gray code pattern.

FIG. 5 is a timing diagram illustrating timing of two bits of a gray code pattern. Each bit of gray encoded servo parameter information may occupy 9 time constants. In the preferred embodiment, a time constant may be 25 ns. Bit 500 indicates how a logical 1 bit may be characterized by bipolar flux transitions occurring adjacent to each other followed by a neutral region. Bit 501 indicates how a logical 0 may be characterized by a flux transition of one polarity and a flux transition of an opposite polarity separated by a neutral region.

Figure 6:
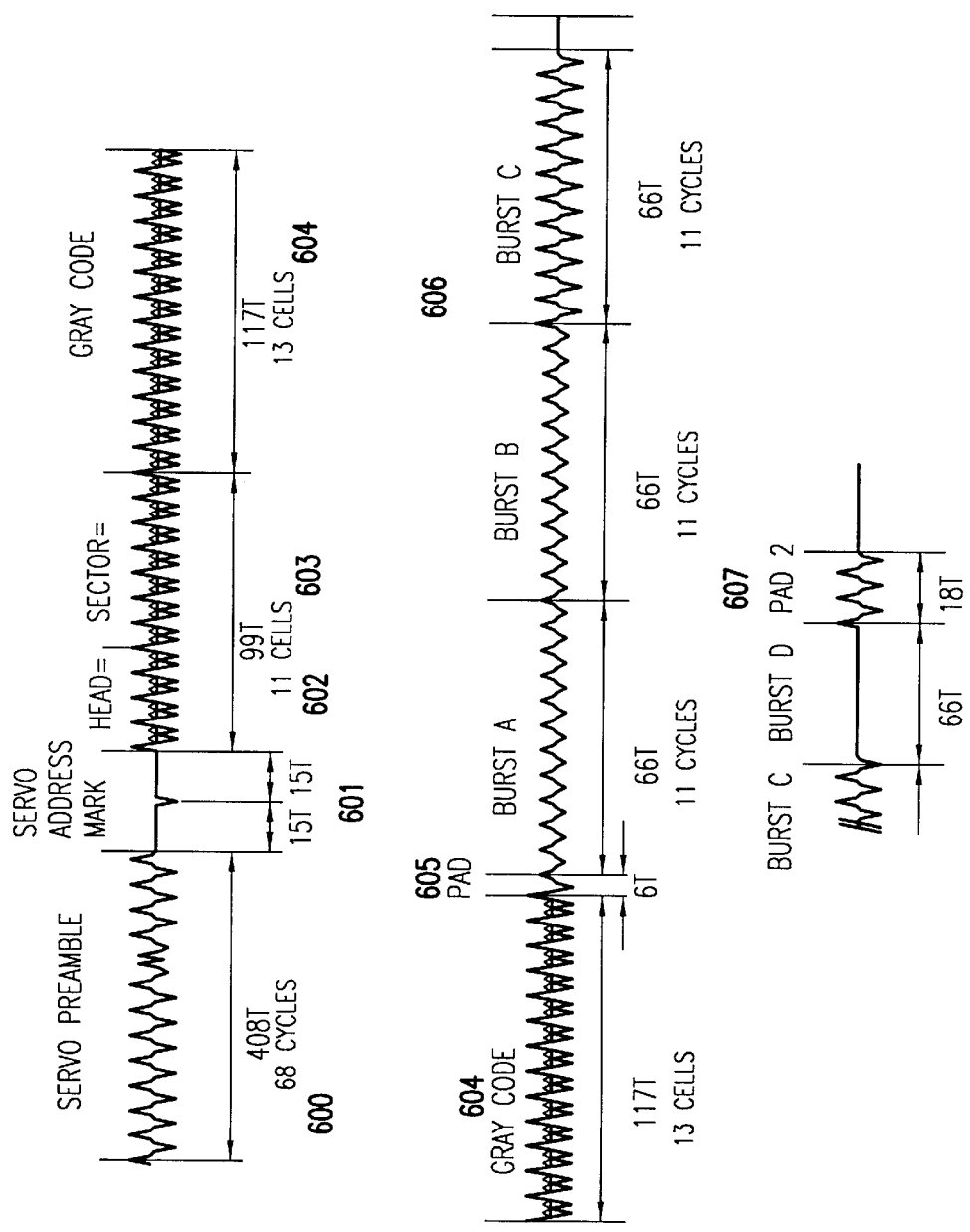
FIG. 6 is a timing diagram illustrating timing of a servo burst.

FIG. 6 is a timing diagram illustrating timing of a servo burst. Servo preamble 600 may precede servo burst information to identify where servo burst information begins and to synchronize timing circuits. Servo preamble 600 may occupy 408 time constants.

As stated earlier, in the preferred embodiment, a time constant may be 25 ns which may correspond to a servo writer clock frequency of 40 MHz. Servo address mark 601 may comprise a single transition sandwiched between two 15 time constant neutral regions. Again, servo address mark 601 following servo preamble 600 may be used by servo decoding circuitry to identify and synchronize with servo parameter/servo burst information.

Following servo address mark 601, servo head/sector field 602 may identify which head and sector on the drive servo parameter/servo burst information corresponds to. Servo head/sector field 602 may occupy a total of 99 time constants at 25 ns per time constant. Servo gray code field 604 may be used to encode cylinder address information sector.

Position correction information may be provided in a servo parameter field one or more sectors in advance for positioning a head before it reaches a sector. Details of how individual bits are encoded to implement gray code encoding are described in FIG. 5. Basically, a gray code may be any convolutional code in which only one bit changes per transition from a present code vector to a next code vector in a sequence. A gray code in a servo parameter field may be used in the present invention to represent magnitude of RRO and correspondingly, a correction factor for positioning a head over a track.

Servo gray code field 604 may occupy 117 25 ns time constants. A pad field 605 may be used to separate burst data from gray code data and may occupy 6 25 ns time constants. A, B, C, and D burst data 606 may be used to determine relative offset of a track center and corresponding head. Finally, a second pad field 607 may be used to separate servo burst information from other track data.

Figure 7:
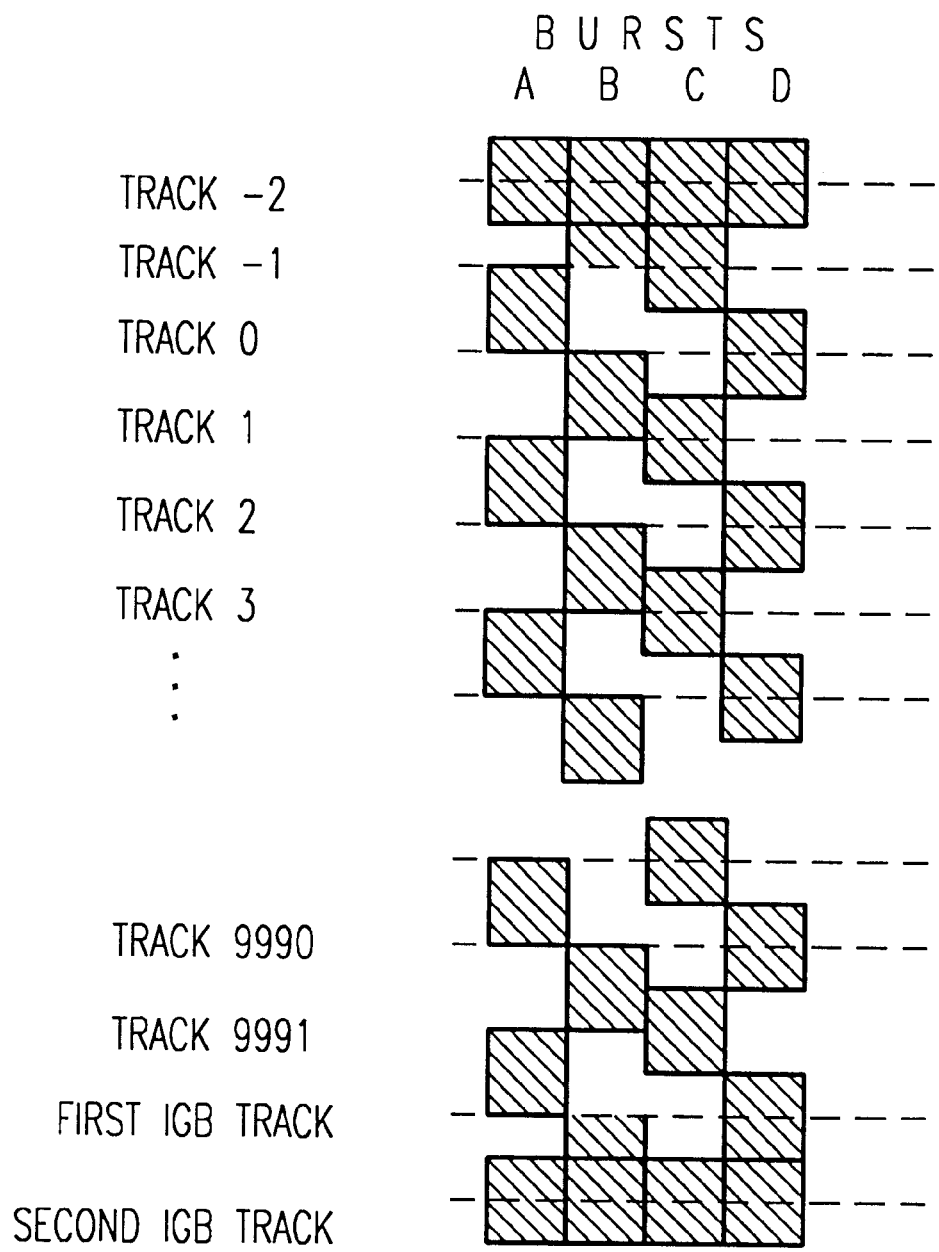
FIG. 7 is a diagram illustrating A, B, C, and D servo burst patterns.

FIG. 7 is a diagram illustrating A, B, C, and D servo burst patterns. As described in related applications, A, B, C, and D servo burst information is written by servo writer at disk assembly time. With track 0 as a frame of reference, C burst corresponding to track 0 may be centered on track −1. D burst may be centered on track 0 while A and B bursts may be situated in between track 0 and track −1 for burst A and between track 0 and track 1 for burst B.

Figure 8A:
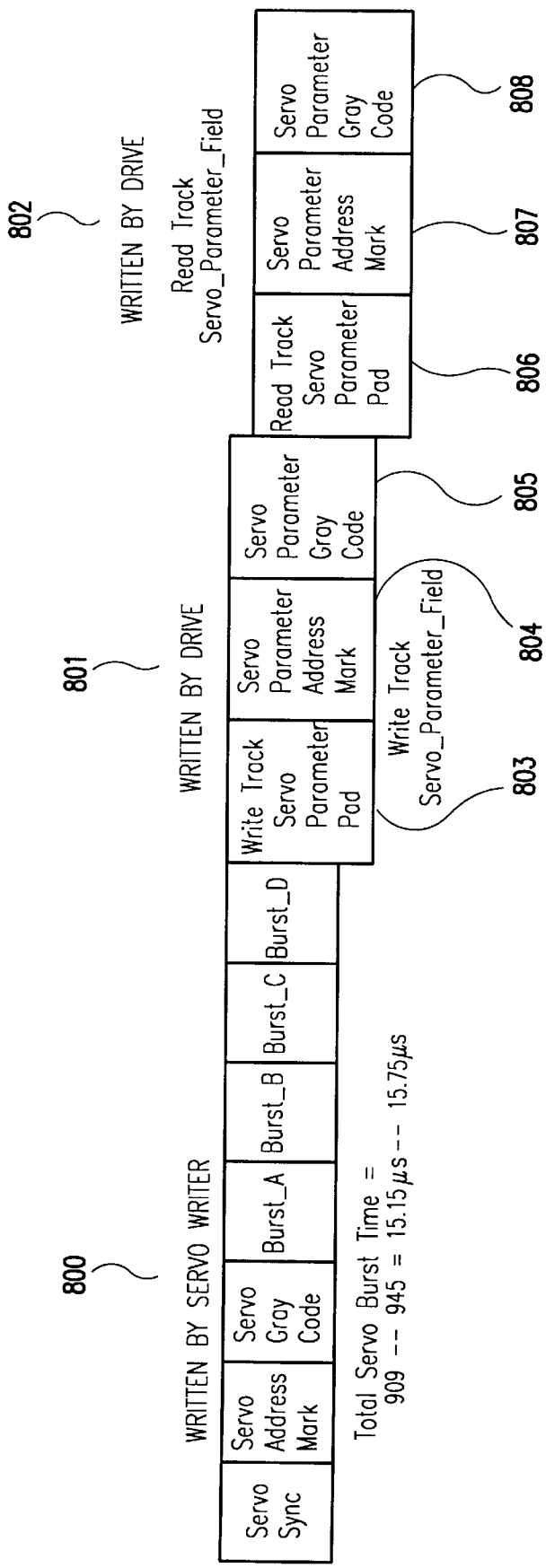
FIG. 8A is a diagram illustrating servo burst patterns.
Figure 8B:
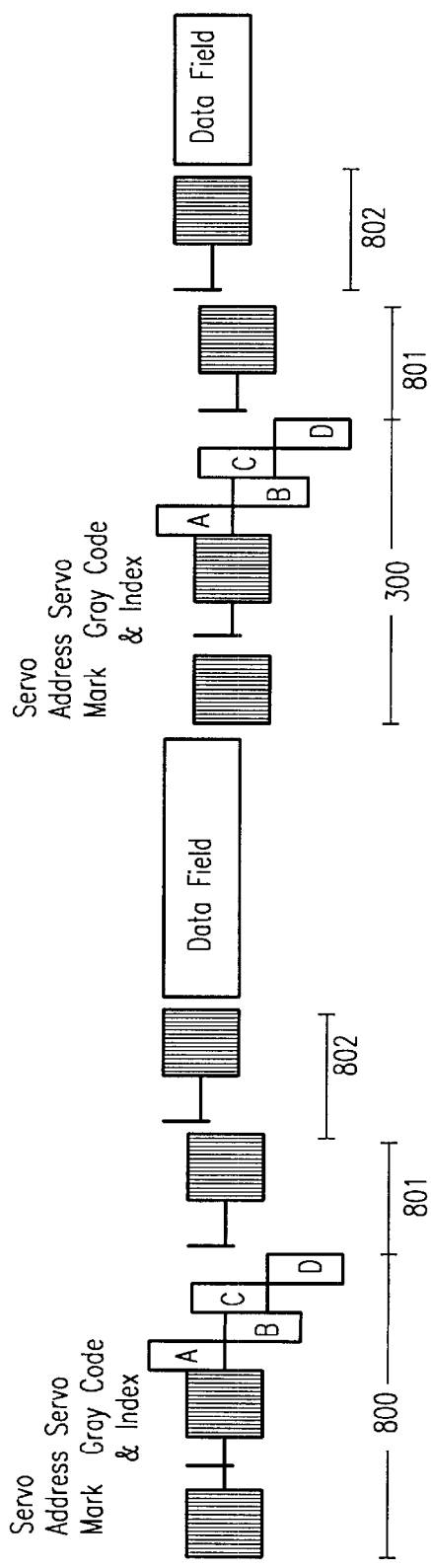
FIG. 8B is a diagram illustrating a read servo parameter field.
Figure 8C:
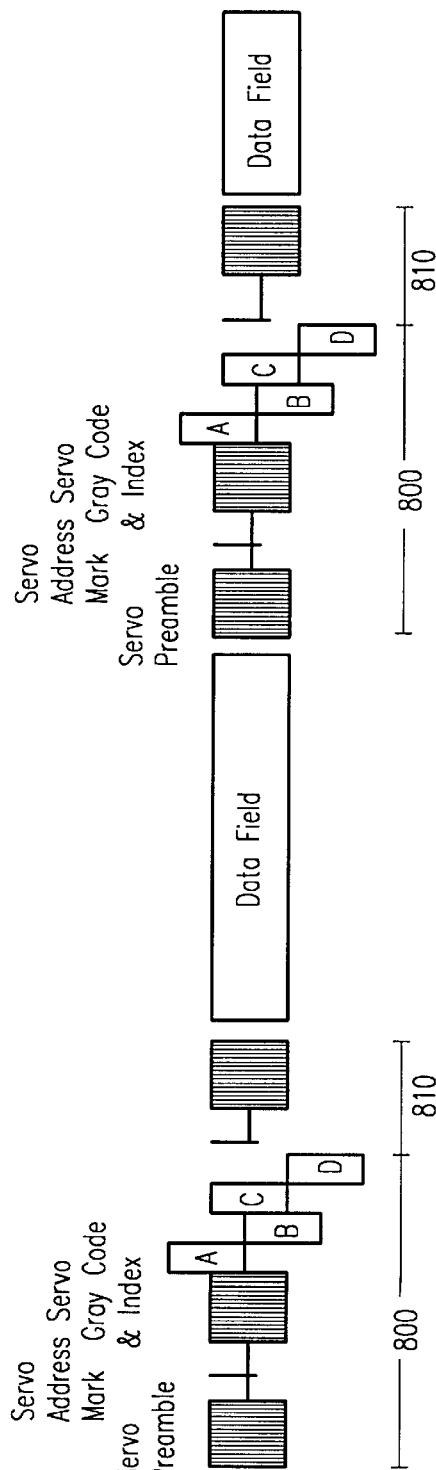
FIG. 8C is a diagram illustrating a write servo parameter field.

FIG. 8A is a diagram illustrating servo burst patterns and read and write servo parameter fields. FIG. 8B is a diagram illustrating servo burst patterns and separate read and write servo parameter fields configuration. FIG. 8C is a diagram illustrating servo burst patterns and a combined servo parameter fields configuration used for both read and write operation.

Servo burst information 800 may contain fields with timing as described in FIG. 6. Write track servo parameter field 801 may contain information related to write track RRO for a subsequent sector. Read track servo parameter field 802 may contain information related to read track RRO for a subsequent sector.

Normally, if deviations from track center due to RRO is less than around 30% of track width, then servo parameter information for both read and write heads may be combined into one track servo parameter field 810 to save disk surface overhead. This servo parameter field may be written somewhere in the middle of the read track center and the write track center. This servo parameter field can be read back during either read operation or write operation.

However, offsets larger than 30% may require both servo parameter fields 801 and 802 to be read individually depending on whether the present disk operation is a read or a write. Regardless of the operation, a following read may be performed to determine tracking accuracy using servo parameter information decoded from the disk.

Write track servo parameter pad 803 may be used to isolate write track servo parameter field 801 from servo burst pattern 800. Write track servo parameter address mark 804 may be used to synchronize decoding circuitry. A simplified servo parameter address mark (for example a simple DC erase mark) may be used.

Write track servo parameter gray code 805 may contain encoded information representing RRO cancellation values and other encoded information related to offset for a write track in a subsequent sector. Similarly, read track servo parameter pad 806 may be used to isolate read track servo parameter field 802 from write track servo parameter field 801. Read track servo parameter address mark 807 may be used to synchronize decoding circuitry.

Finally, read track servo parameter gray code 808 may contain encoded information representing RRO cancellation values and other encoded information for a read track in a subsequent sector. If j is the present sector then information stored in servo parameter information fields may be characterized as corresponding to j+nth sector where n is a value greater than 1 and less than the maximum number of sectors. In the preferred embodiment, n may be 1, 2, 3 or may be higher. Set n=1 is adequate in majority of application.

As previously described, write track servo parameter field 801 may be written using corrected positioning derived from servo burst pattern 800. Servo burst pattern 800 may be written by a servo writer during disk assembly. Using correction information decoded from servo burst pattern 800 and derived from reading A, B, C, and D burst patterns, write track servo parameter field 801 may be written at an adjusted track position according to offset values.

For read track servo parameter field 802, correction information from previous reads of servo burst pattern 800 and write track servo parameter field 801 may be used to write read track servo parameter field 802 at a corrected position. Offsets due to RRO and other sources may be encoded and written into servo parameter gray code field for each read track servo parameter field 802, and write track servo parameter field 801. Such encoded offsets may correspond to subsequent sectors.

Minor offsets may be compensated for using servo parameter information from the combined servo parameter field 810 for both read track and write track. Excessive offset, offset greater than around 30% of track width may require that offset information be read from respective servo parameter fields depending on present disk operation. For example, if the present disk operation is a read, and offset is greater than 30% of track width, position correction information may be read from read track servo parameter field 802.

Conversely, a write operation coupled with offset error of around 30% may require correction information read from write track servo parameter field 801. Offset error less than around 30% of track width may allow correction information for both read and write operations to be read from the combined track servo parameter field 810 to save servo overhead.

Figure 9:
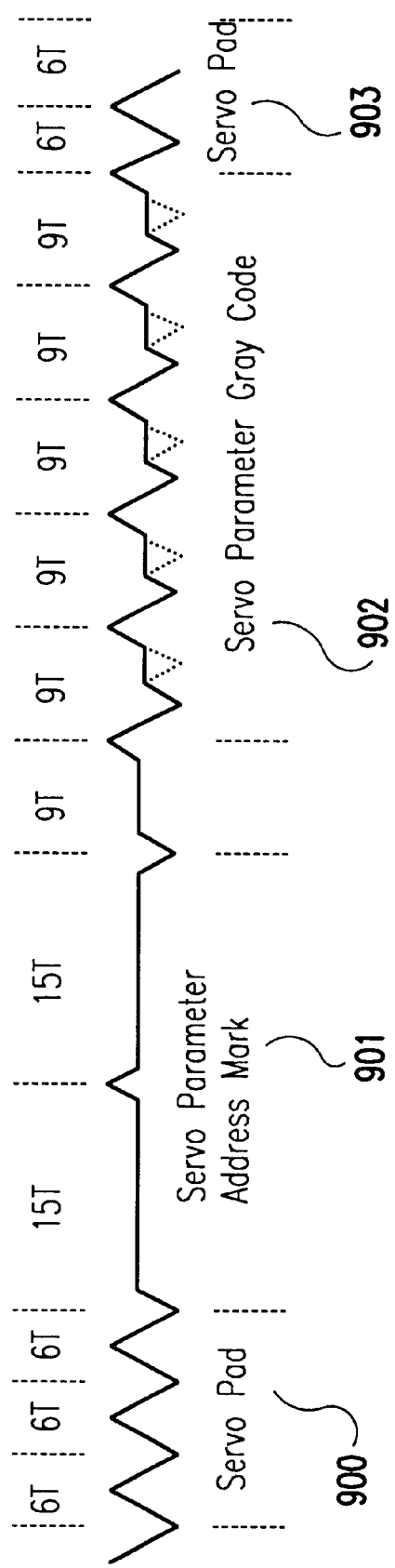
FIG. 9 is a timing diagram illustrating timing of the servo parameter field of the present invention.

FIG. 9 is a timing diagram illustrating timing of read and write servo parameter field of the present invention. Servo pad 900 may occupy 3, 6 time constant periods where a time constant may be 25 ns. Servo parameter address mark 901 may comprise a pulse centered between two neutral zones occupying 15 25 ns time constants each.

Servo parameter address mark 904 with a simple DC erase may be used as alternative to replace 901. Servo parameter gray code field 902 may contain coded information representing offset due to RRO and other sources. Finally servo pad 903 may be used to isolate servo parameter information from subsequent data fields.

Figure 10:
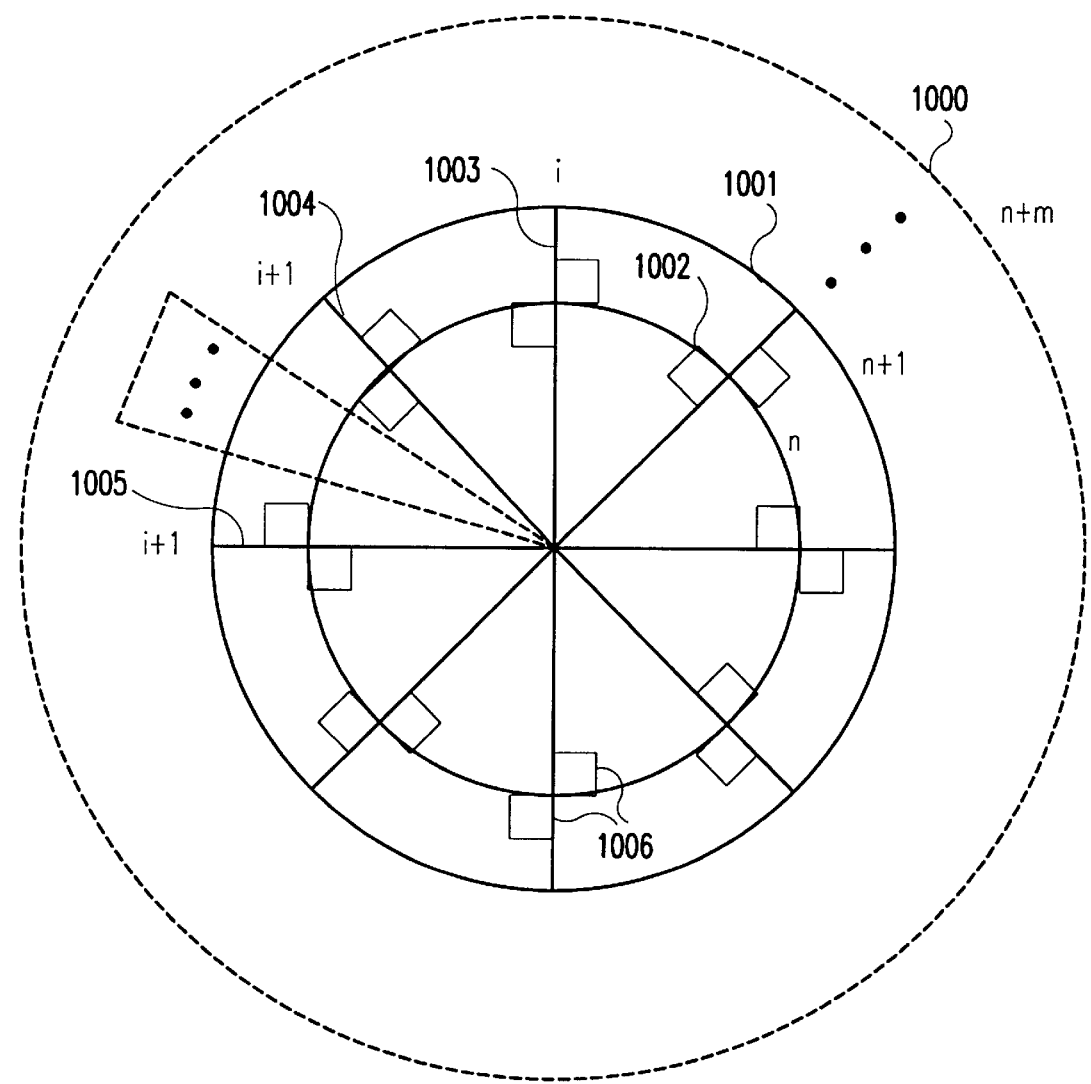
FIG. 10 is a diagram illustrating placement of servo parameter fields on tracks along sector boundaries.

FIG. 10 is a diagram illustrating placement of servo parameter fields on tracks along sector boundaries. FIG. 10 may represent the surface of a disk. A disk surface may comprise a series of concentric tracks from an outer track around the outer perimeter of a disk to the inner track near the disk spindle.

In addition to tracks a disk surface may be divided into sectors which are divided by radii and contain many track segments from inner track segments to outer track segments. Depending on drive technology and density sector size and number may vary. In the preferred embodiment of the present invention, the disk surface may be divided into seventy two servo sectors.

A typical sector may encompass segments of concentric tracks which fall within it. A sector may be bounded by two radii extending outward from the spindle center, and separated by around 5 degrees. Track n 1002 may be considered the present track for reference purposes.

Tracks may lay alongside each other in successive number as track n+1 1001 to track n+m 1000 for an m track drive. Likewise, sectors may be marked, using sector i 1003 as a reference for the present sector, as sectors i+1 1004 up to sector i+j for a j sectored drive. Once again, in the preferred embodiment j may be around seventy two.

Servo information fields 1006 may be placed on every track at a sector boundary. Servo burst information may include head and sector number identifying where on the disk surface, in terms of sector number, a particular servo parameter information field is relevant to. Numbering servo parameter information in terms of sector and track is important as in the preferred embodiment where a given servo parameter information field stored in sector i, track n, may be used for position correction in sector i+k, track n, where k is a number 1 or greater but less than the maximum number of sectors j.

Accordingly, actuator arm position corrections may be made in advance of the sector where the position correction would be required. Such a feed forward effect shortens servo control command output delay time by eliminating calculation time needed to obtain a position correction value in the critical command output routine for current sample and making calculation required for correction in the non-critical command control routine at previous sample.

Figure 11:
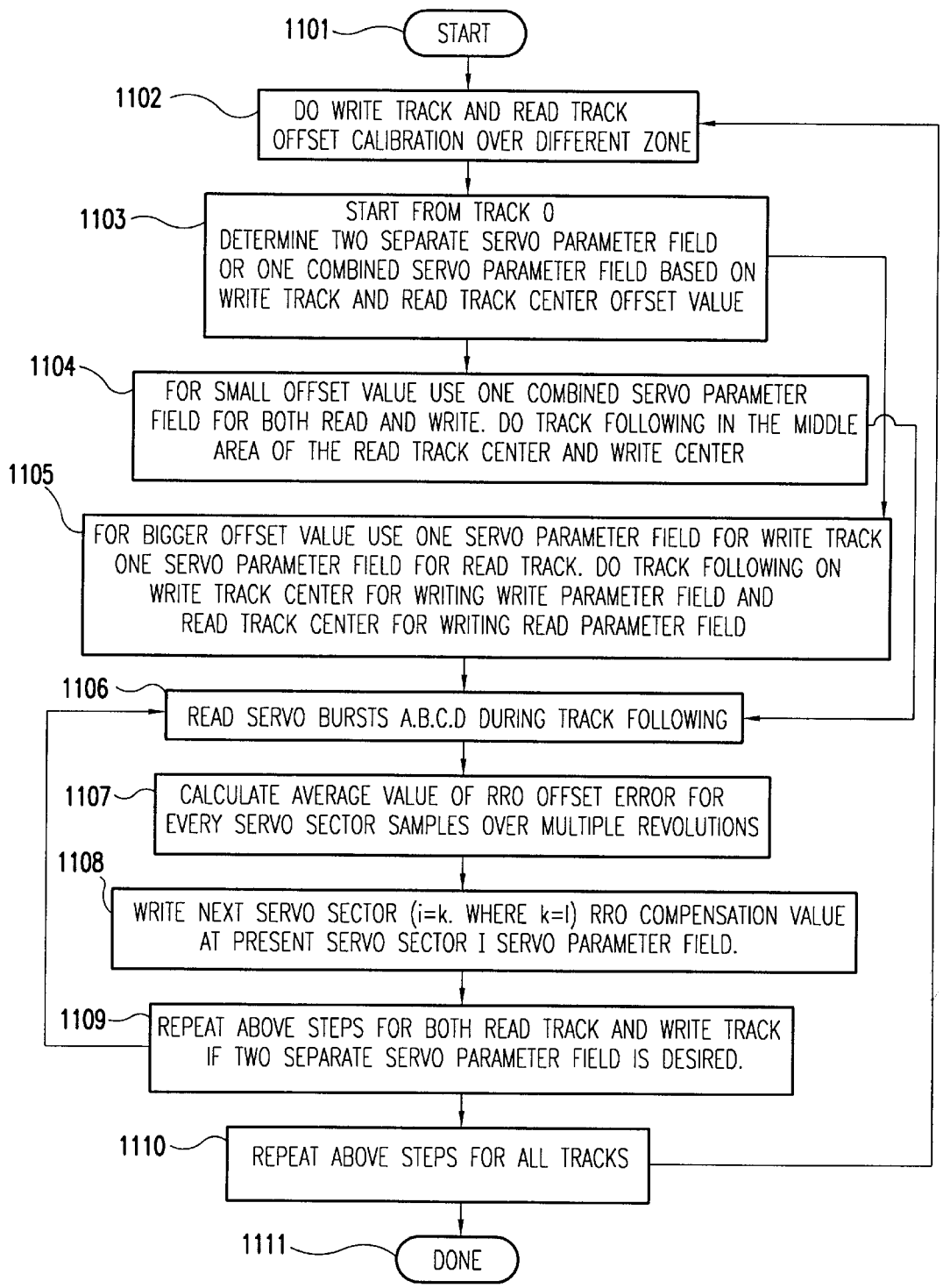
FIG. 11 is a block diagram illustrating functional elements of the present invention.

FIG. 11 is a flow chart illustrating functional steps of the present invention for writing a servo parameter field on the disk. Step 1101 represents the start of the procedure. In step 1102, write track and read track calibrations are performed for different zones. In step 1103, starting from track 0, a determination is made whether two separate servo parameter fields or one servo parameter field will be used based upon the offset between the write track center and read track center.

In step 1104, for a small offset value, one combined servo parameter field is used for both read and write operations. Track following is performed in a middle area between the read track center and the write track center. In step 1105, if the offset value between read and write tracks is greater, one servo parameter field is used for the read track and another for the write track. The track following on the write track is used in writing the write parameter field, and the track following on the read track is used in writing the read parameter field.

In step 1106, servo bursts A, B, C, and D are read during track following. A, B, C, and D offset servo bursts may be read from servo sector information written to a disk surface by a servo writer during disk assembly. Servo sector information may be used to correct actuator arm positioning by measuring relative amplitudes of A, B, C, and D offset servo bursts and calculating track center deviations according to the magnitude of relative amplitudes. Nominal A, B burst amplitudes should be equal and represent mean amplitude, while burst C should be zero amplitude and burst D, positioned at track center, should be maximum amplitude.

In step 1107, an average RRO offset error value is calculated for every servo sector sampled over multiple revolutions. More samples taken of servo sector information may result in a more accurate value for RRO. Twenty to twenty five samples may be used to calculate an average value for RRO offset for write track center registration.

In step 1108, the next servo sector RRO compensation value is written in the servo parameter field of the present sector. Servo parameter information representing such an average RRO value may be gray encoded and written in a section reserved for write track servo parameter information. Also, positioning error for an i+k; k<j sector, where i is the present sector number and k is a value of 1 or greater up to the maximum number of sectors j, typically K=1, may be gray encoded and written in a section reserved for write track servo parameter information. By writing the RRO compensation value a sector ahead, the value may be read ahead of time and RRO compensation achieved for the proceeding sector.

In step 1109, steps 1106–1108 are repeated for both read and write tracks of two separate servo parameter fields are desired. A predetermined number of samples for read track centering may be taken and averaged in a similar manner to the write track to calculate average RRO for read track center registration. Servo parameter information representing average RRO may then be gray encoded and written in a section reserved for read track servo parameter information. Also, positioning error for an i+j sector where i is the present sector number and j is a value of 1 or greater up to the maximum number of sectors, typically K=1, may be gray encoded and written in a section reserved for write track servo parameter information.

In step 1110, steps 1102–1109 are repeated for all tracks on a disk. Once all tracks have been completed processing is done as indicated in step 1111.

Both read and write track servo parameter information may be written using corrected positions derived independently for read and write heads. Both read and write track servo parameter information may be written during manufacturing burn in time.

Figure 12:
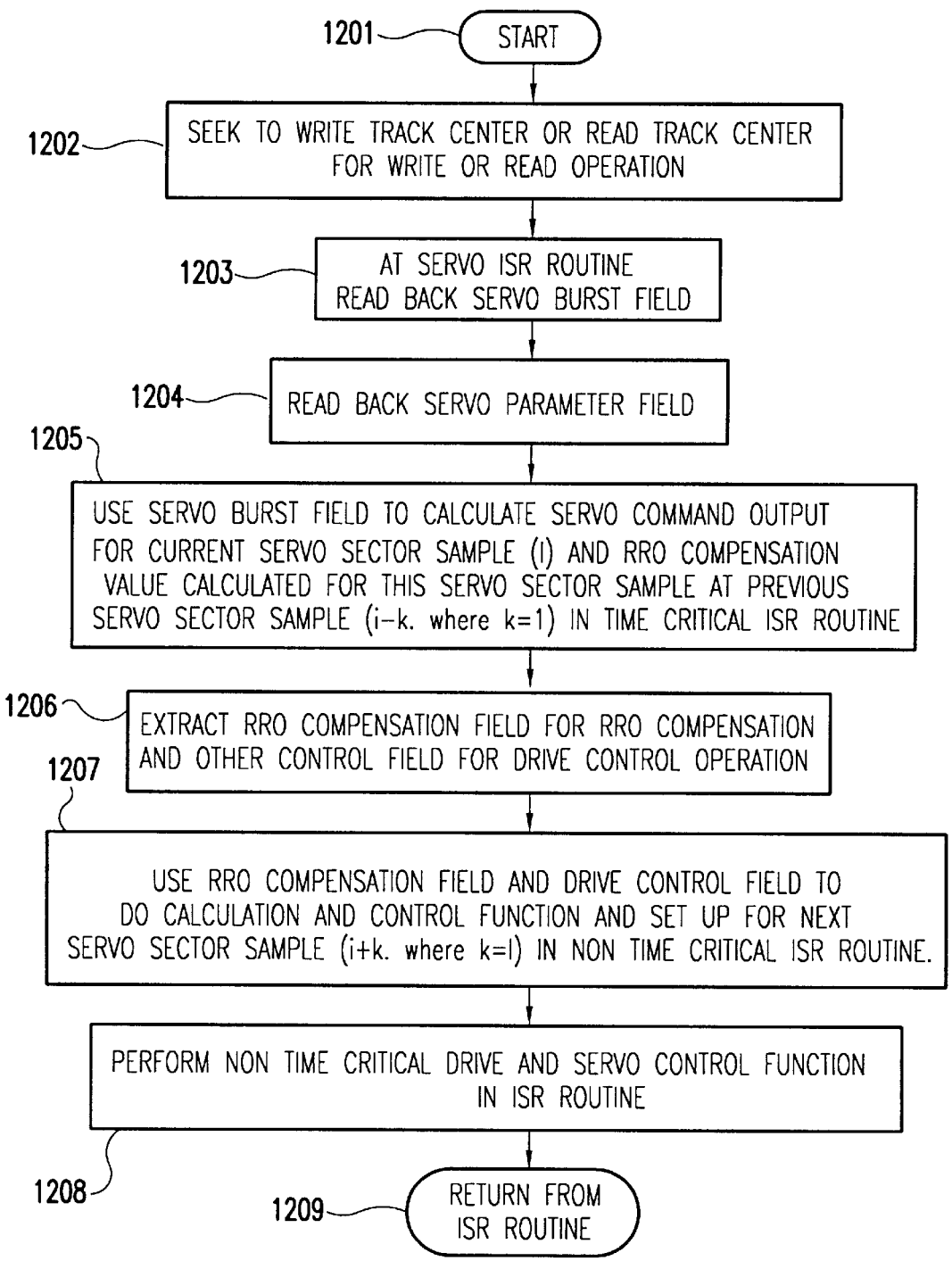
FIG. 12 is a flow chart illustrating functional steps of the present invention during a normal operation mode.

FIG. 12 is a flow chart illustrating functional steps of the present invention during normal operation mode. The start of normal operation mode is indicated by step 1201. During normal operation mode, the RRO compensation field of the servo parameter information may be used to cancel the RRO for that track and the control field of the servo parameter information may be used for firmware control and servo defect management and compensation.

In step 1202, a seek operation is made to the write track center or the read track center for a respective write or read operation. In step 1203, at a servo ISR routine, the servo burst field is read back. In step 1204, the servo parameter field is read back.

In step 1205, the servo burst field is used to calculate the servo command output for the present servo sector sample i. The RRO compensation value is calculated for servo sector sample i at a previous sector sample i−k, where k is preferably 1. This first ISR routine may be time critical, as RRO may need to be compensated before a head reaches a next sector.

In step 1206, the RRO compensation field for RRO compensation and other control fields for drive control operation are extracted. in step 1207, the RRO compensation field and drive control field is used to calculate runout and perform control functions and set up for a next servo sector sample i+k. This latter ISR routine may not be time critical, as such calculations are performed in advance of the head reaching the next servo sector i+k.

In step 1208, these non-time critical drive and servo control functions are performed in an ISR routine. Processing terminates in step 1209 with a return from the ISR routine.

While the preferred embodiment and alternative embodiments have been disclosed and described in detail herein, it may be apparent to those skilled in the art that various changes in form and detail may be made without departing from the spirit and scope of the invention. For example, while in the preferred embodiment an inductive write head and an MR head is used to write an information signal and generate a read signal respectively, the present invention may be used to compensate for offset on virtually any type of head technology where head alignment with respect to actuator arm position is important.

Similarly, while the burst pattern of the present invention is, for example, a series of A, B, C, and D bursts written on a disk surface in a pattern where A burst is centered at track position n−0.5, B burst is centered at track position n+0.5, C burst is centered at track position n−1 and D burst is centered on track n, the pattern may be reversed. Moreover, although the controller circuit of the preferred embodiment is drawn to interconnected devices, the present invention may comprise an integrated circuit without departing from the spirit and scope of the present invention.

I claim:

1. In a disk drive for storing magnetic information on a disk drive surface, a servo controller for compensating for repetitive runout error in positioning an actuator arm, the actuator arm being attached to a servo positioning motor, the servo controller comprising:

a controller for receiving a plurality of servo burst information fields from a read circuit, each of the plurality of servo burst information fields comprising a plurality of offset segments and other information read from a plurality of predetermined locations on the disk drive surface by the read circuit, the controller for controlling writing of at least two servo parameter information fields per servo sector per track to the disk drive surface at a predetermined location, each of the at least two servo parameter information fields per servo sector per track containing predetermined servo information, wherein the at least two servo parameter information fields per servo sector per track are written to the disk drive surface at a predetermined location using independently corrected actuator arm positions derived from the plurality of offset segments, wherein the plurality of offset segments further comprise offset A, B, C, and D burst segments, wherein A and B burst segments are offset in opposite directions from track center by half an intra track distance, C burst segment is offset a full intra track distance so as to be centered on an adjacent track, and D burst segment is centered on the current track with zero offset, and wherein the predetermined servo information comprises gray encoded repetitive runout error correction information for positioning the actuator arm for a subsequent sector.

2. The controller of claim 1, wherein said subsequent sector further comprises a j+nth sector where j is the present sector and n is a value of one or greater, but less than the total number of sectors on said disk drive surface.

3. The controller of claim 2, wherein the at least two parameter information fields per servo sector per track each comprise a read track servo parameter information field, the read track servo parameter information field further comprising gray encoded repetitive runout error correction information for positioning the actuator arm for a subsequent sector.

4. The controller of claim 2, wherein the at least two parameter information fields per servo sector per track each comprise a write track servo parameter information field, the write track servo parameter information field further comprising gray encoded repetitive runout error correction information for positioning the actuator arm for a subsequent sector.

5. The controller of claim 2, wherein the at least two parameter information fields per servo sector per track each comprise read and write track servo parameter information fields, the read and the write track servo parameter information fields further comprising gray encoded repetitive runout error correction information for positioning the actuator arm for a subsequent sector.

6. The method of claim 5, wherein an average repetitive runout error value is generated by reading the servo burst information field a predetermined number of times corresponding to a predetermined number of revolutions of the disk drive surface and calculating an average repetitive runout value.

7. The controller of claim 4, wherein said plurality of predetermined locations further comprises each servo sector boundary for each track on said disk drive surface immediately following said servo burst information.

8. In a disk drive for storing magnetic information on a disk drive surface, a method for compensating for repetitive runout error in positioning an actuator arm, the actuator arm having a read head and a write head affixed thereto, the read head and the write head being in close proximity to each other at a first end of the actuator arm along a longitudinal center, the actuator arm being attached to a servo positioning motor at a second end, the method comprising the steps of:

reading a servo burst information field comprising a plurality of offset segments and other information from the disk drive surface;

calculating an average repetitive runout error value over a predetermined number of disk surface revolutions;

writing at least two servo parameter information fields per servo sector per track to the disk drive surface, each of the at least two servo information fields comprising predetermined servo information for correcting an actuator arm position;

reading one of the at least two servo information fields per servo sector per track written in a plurality of predetermined locations;

decoding the predetermined servo parameter information from one of the at least two servo information fields per servo sectors per track;

generating a position error signal from the predetermined servo parameter information; and correcting the actuator arm position in response to the position error signal.

9. The method of claim 8, wherein the step of writing at least two servo parameter information fields per servo sector per track further comprises writing the at least two servo parameter information fields per sector per track at a predetermined location using a corrected actuator arm position derived from the plurality of offset segments read from the disk drive surface.

10. The method of claim 9, wherein said predetermined servo information comprises gray encoded repetitive runout error correction information for positioning said actuator arm for a subsequent sector.

11. The method of claim 10, wherein said subsequent sector further comprises a j+nth sector where j is the present sector and n is a value of one or greater, but less than the total number of sectors on said disk drive surface.

12. The method of claim 11, wherein the step of writing at least two servo parameter information fields per servo sector per track further comprises writing a read track servo parameter information field.

13. The method of claim 11, wherein the step of writing at least two servo parameter information fields per servo sector per track further comprises writing a write track servo parameter information field.

14. The method of claim 11, wherein the step of writing at least two servo parameter information fields per servo sector per track further comprises writing a read track servo parameter information field and a write track servo parameter information field.

15. The method of claim 14, wherein the step of calculating an average repetitive runout error value over a predetermined number of disk surface revolutions further comprises reading the servo burst information field a predetermined number of times corresponding to a predetermined number of disk surface revolutions and calculating an average repetitive runout value.

16. The method of claim 8, wherein said plurality of predetermined locations further comprises each servo sector boundary for each track on said disk drive surface.

17. The method of claim 16, wherein said corrected actuator arm position is derived from said plurality of offset information and other information by comparing relative amplitudes of said plurality of offset segments.

18. The method of claim 17, wherein said plurality of offset segments further comprises offset A, B, C, and D burst segments, wherein A and B burst segments are offset in opposite directions from track center by half an intra track distance, C burst segment is offset a full intra track distance so as to be centered on an adjacent track, and D burst segment is centered on the present track with zero offset.

19. A method for compensating for repetitive runout error in positioning an actuator arm in a disk drive system, the method comprising the steps of:

reading a servo burst information field from a disk drive surface in the disk drive system, the servo burst information comprising a plurality of offset segments;

calculating an average repetitive runout error value for the servo burst information over a predetermined number of revolutions of the disk drive surface;

writing to the disk drive surface two or more servo parameter information fields per servo sector per track of the disk drive surface, the two or more servo parameter information fields comprising servo information for correcting an actuator arm position based on the repetitive runout error value;

reading a selected one of the two or more servo parameter information fields from a plurality of servo sectors and tracks on the disk drive surface;

decoding the servo parameter information from the selected servo parameter information field;

generating a position error signal from the decoded servo parameter information; and correcting the position of the actuator arm in response to the position error signal.

20. The method of claim 19, wherein the writing to the disk drive surface of two or more servo parameter information fields per servo sector per track of the disk drive surface, further comprises writing a read track servo parameter information field.

21. The method of claim 19, wherein the writing to the disk drive surface of two or more servo parameter information fields per servo sector per track of the disk drive surface, further comprises writing a write track servo parameter information field.

22. The method of claim 19, wherein the writing to the disk drive surface of two or more servo parameter information fields per servo sector per track of the disk drive surface, further comprises writing a read track servo parameter information field and a write track servo parameter information field.

* * * * *